W. O. DUNTLEY.
ELECTRIC DRILL.
APPLICATION FILED MAY 2, 1904.
1,109,325.
Patented Sept. 1, 1914.
4 SHEETS—SHEET 1.
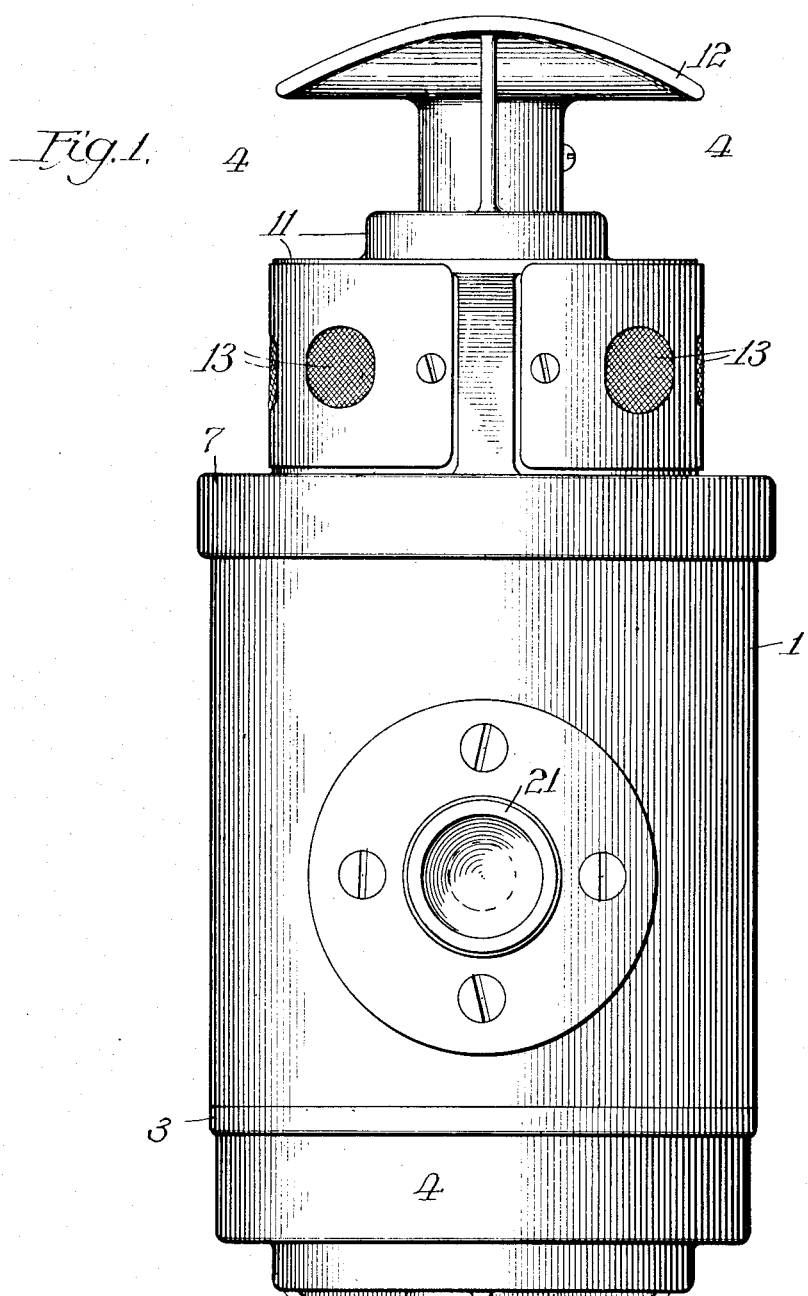
Fig. 1.
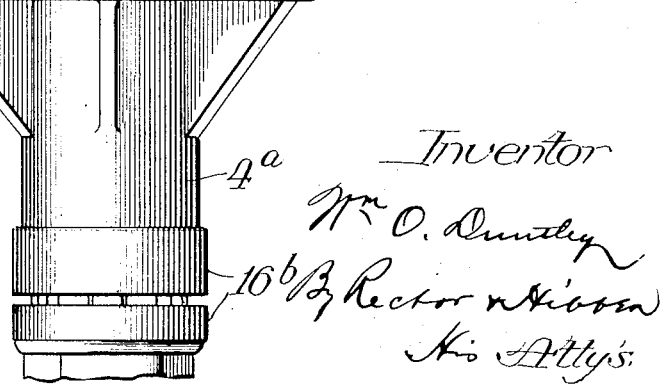

W. O. DUNTLEY.
ELECTRIC DRILL.
APPLICATION FILED MAY 2, 1904.

1,109,325.

Patented Sept. 1, 1914.
4 SHEETS—SHEET 3.

Witnesses:
Edw. Barrett
Louis B. Erwin

Inventor
Wm. O. Duntley
By Rector Hibben
His Atty's

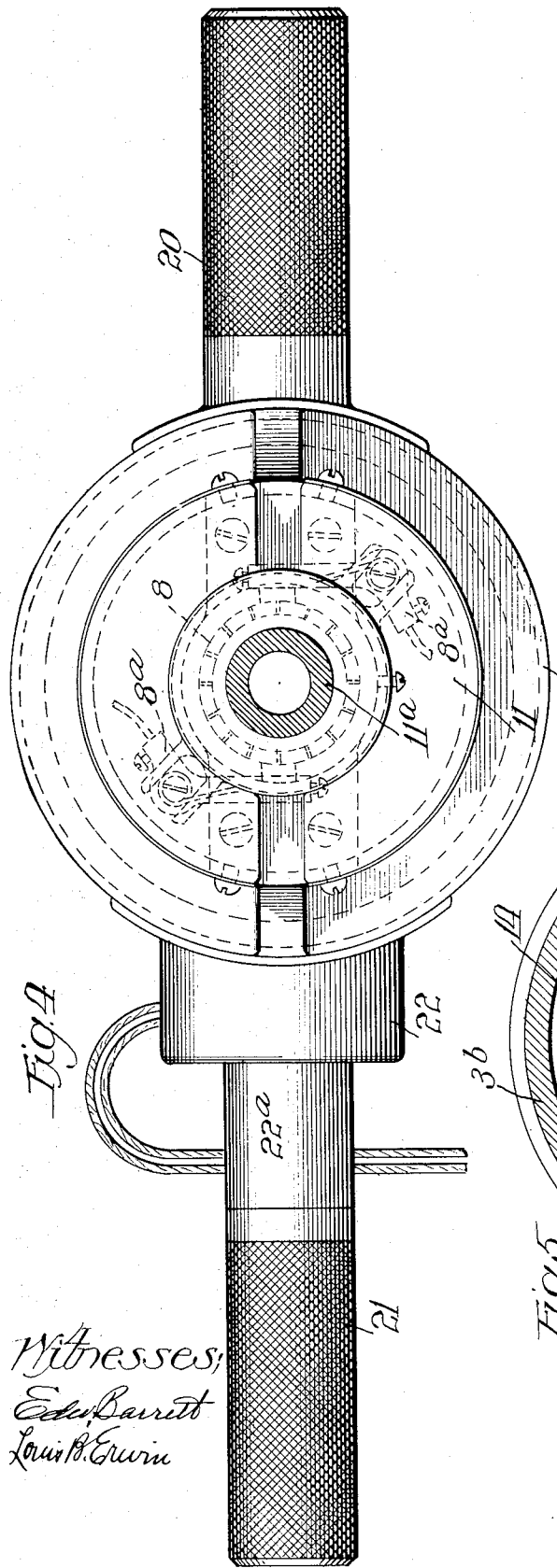
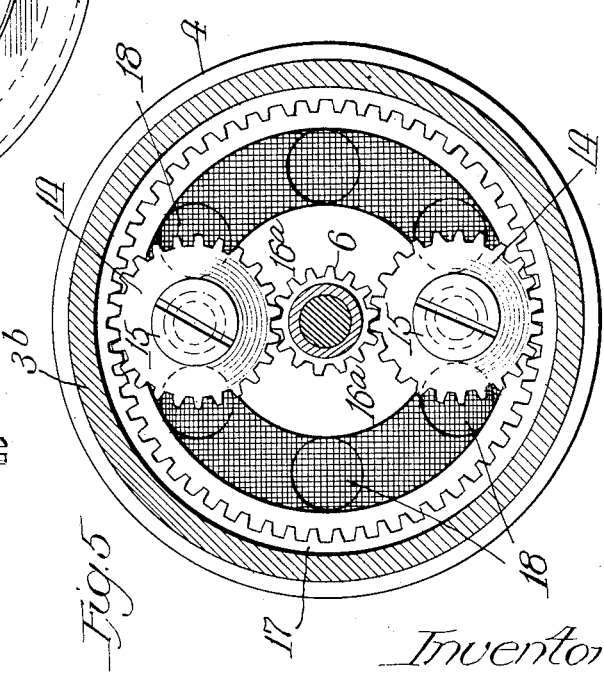

UNITED STATES PATENT OFFICE.

WILLIAM O. DUNTLEY, OF CHICAGO, ILLINOIS, ASSIGNOR TO CHICAGO PNEUMATIC TOOL COMPANY, OF CHICAGO, ILLINOIS, A CORPORATION OF NEW JERSEY.

ELECTRIC DRILL.

1,109,325.  Specification of Letters Patent.  Patented Sept. 1, 1914.

Application filed May 2, 1904. Serial No. 206,015.

*To all whom it may concern:*

Be it known that I, WILLIAM O. DUNTLEY, a citizen of the United States, residing at Chicago, Cook county, Illinois, have invented certain new and useful Improvements in Electric Drills, of which the following is a specification.

My invention relates to drills of that type or class operated by electricity and the object thereof is to produce a machine or drill of this character which is simple and inexpensive of manufacture and efficient and durable in operation.

The various features of advantage and utility comprised in my invention will be apparent from the description hereinafter given.

Figure 2:
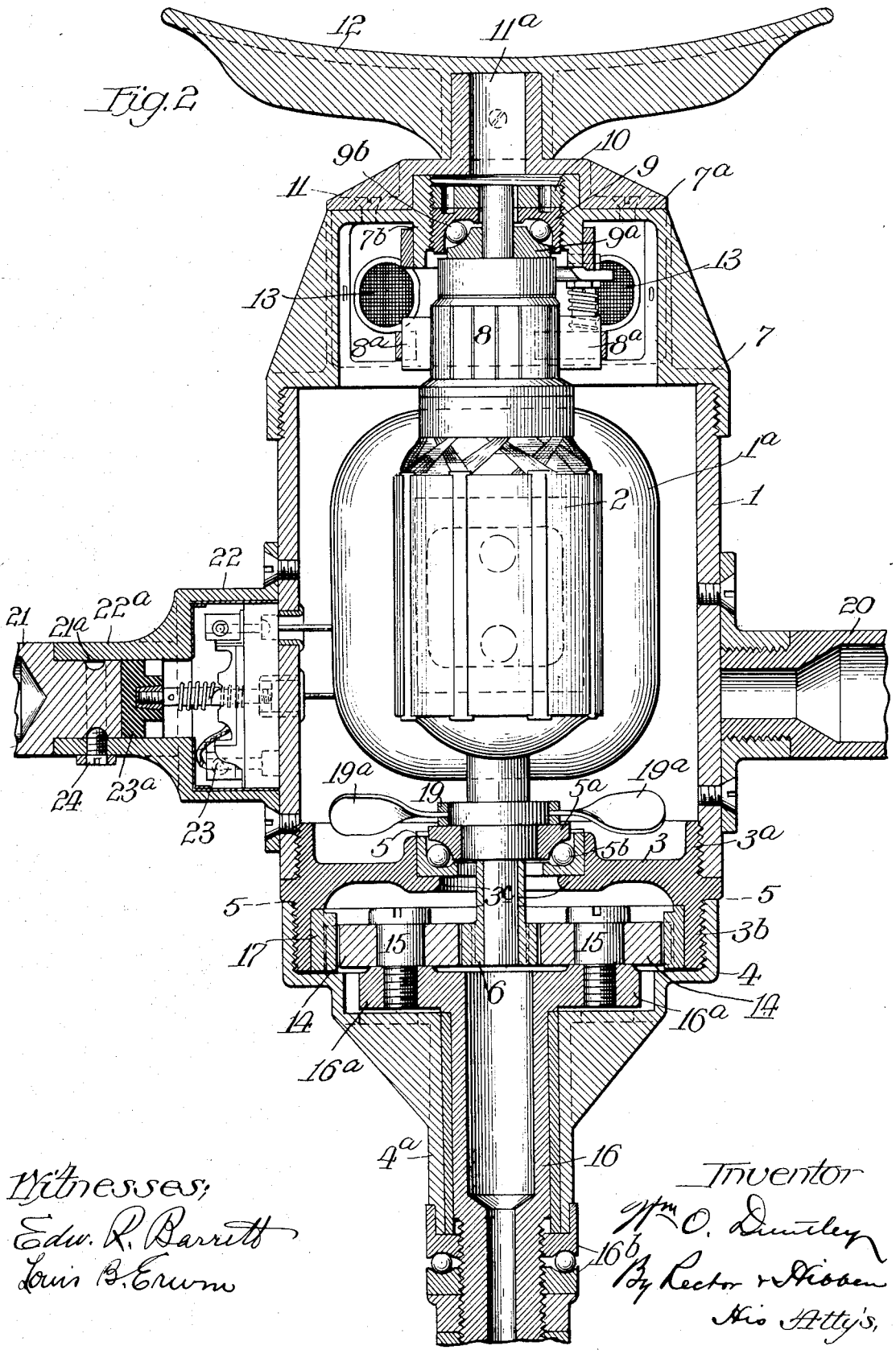
Figure 3:
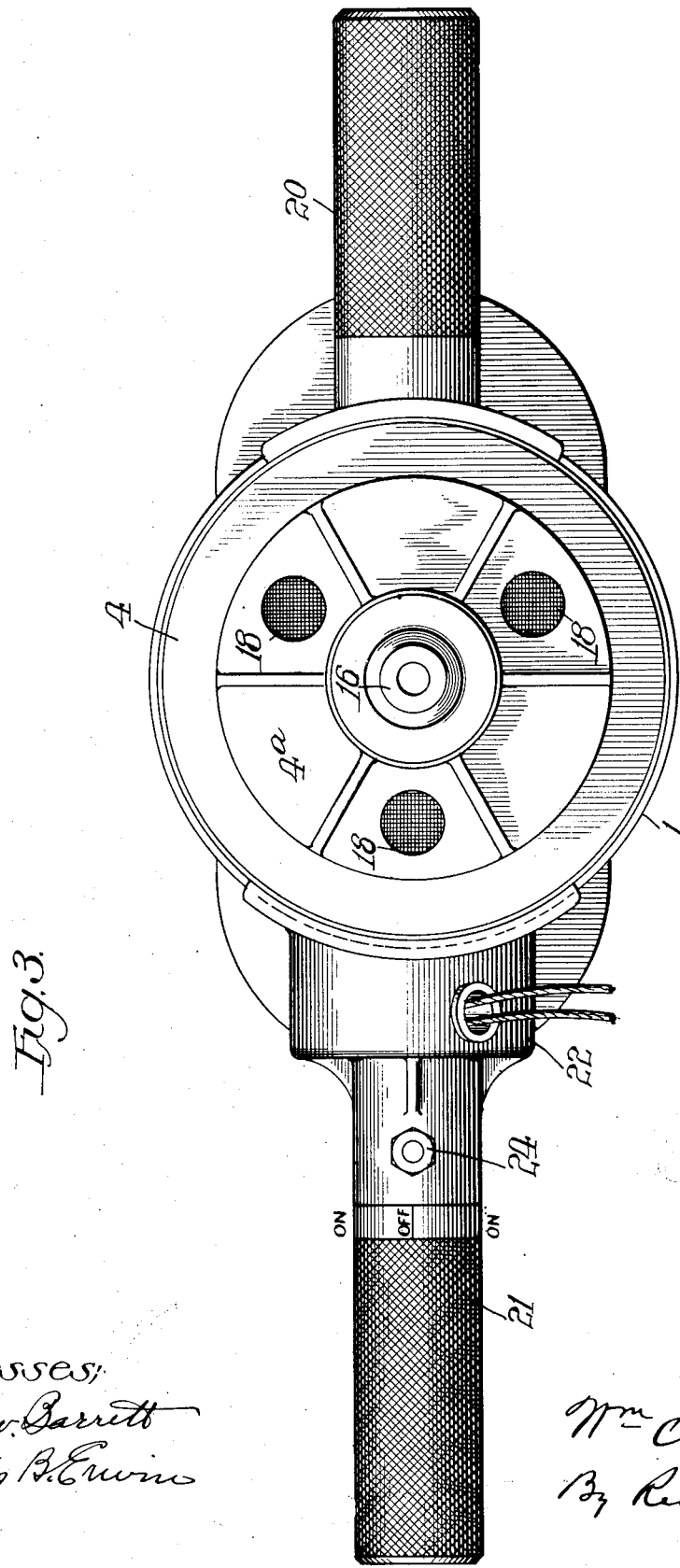

In the drawings, Figure 1 is an elevation of my drill or machine; Fig. 2 a central longitudinal section thereof; Fig. 3 a bottom plan thereof; Fig. 4 a top sectional plan on line 4—4 of Fig. 1, taken below the breast plate, and Fig. 5 a sectional plane on line 5—5 of Fig. 2 showing the gearing between the electric motor and the drill spindle.

As herein shown, my machine comprises essentially an electric motor tool spindle and associated parts constructed and arranged in a novel and original manner for the production of an efficient and serviceable machine, to which certain desirable features are added as hereinafter set forth.

Referring to the drawings, the cylindrical casing 1 of the machine or body of the drill forms the field frame of the electric motor and supports its field magnets $1^a$, of which any desired number may be used. The armature 2 is arranged to rotate in suitable bearings formed in end heads secured to the opposite ends of the casing. The lower head 3 has upwardly and downwardly extending annular flanges $3^a$ and $3^b$, the former of which screws into the lower end of the casing, while the latter is adapted to receive the gear case 4.

The lower end of the armature shaft is journaled on the head 3 in a thrust bearing and in the present instance I have illustrated a suitable construction for this purpose. As herein shown, the lower end head 3 has a central opening provided with an annular shoulder $3^c$ which forms a socket adapted to receive the ball cup 5 of a ball bearing, comprising in addition the ball cone $5^a$ and series of balls $5^b$ interposed between the cup and cone. This cone is secured to the armature shaft near its lower end which, below the ball bearing, is reduced in diameter to receive the hub of a driving pinion 6, hereinafter described.

The upper bearing head 7 is screwed or otherwise secured to the casing, and is extended upwardly above the line of the casing to form a case and means of attachment for the commutator 8 and brushes $8^a$ of the electric motor. The top wall $7^a$ of this end head has a central opening inwardly and upwardly flanged and screw-threaded to receive the adjustable ball cup 9 of a ball bearing for the upper end of the armature shaft. The other members of this ball bearing comprise a ball cone $9^a$ secured to the shaft and the series of interposed balls $9^b$. The lower ball bearing is fixed, while the upper one, now being described, is adjustable. To this end, the cup 9 may be screwed up or down to secure the proper adjustment and the same is held in place by the locking nut 10. The brushes may be attached to any point on the inner walls of this upper end head but as shown the same are secured to and suspended from the depending central flange $7^b$ at the central opening.

To the top of the head is detachably secured a cap piece 11 provided with an upwardly extending hub $11^a$ arranged to receive the breast plate 12. For a purpose hereinafter made apparent holes or side openings 13 are provided in the upper head 7 and covered with gauze.

As herein shown the tool spindle and the armature shaft are arranged in alinement and operatively connected by gearing which is of the planetary type. As illustrated more particularly in Figs. 2 and 5 the driving spur pinion 6 on the lower end of the armature shaft meshes with the two spur pinions 14, which are mounted on studs 15 secured to the flanges $16^a$ of the tool spindle 16. These pinions 14 engage a circular toothed rack 17 formed upon or secured to the inner surface of the gear case. The tool spindle bears in the tubular extension $4^a$ of the gear case and has a ball bearing device $16^b$ below such extension. The gear case has a series of gauze covered openings 18, Fig. 5, to coöperate with the similar openings into the upper end head 7.

To avoid the objection of heating of the parts incident to the continued running of the motor, I provide means for ventilating or causing a circulation through the casing by forcing air therethrough so that my drill may be said to be air cooled. As shown, these means consist of a fan which in the present instance comprises a collar 19 mounted on the armature shaft and having a suitable number of blades 19ª driven thereby, with the result that the air is drawn through one series of holes in one end of the casing and forced out through the other series of holes in the other end. The direction of the current of air is optional and dependent upon the direction of inclination of the blades of the fan, of which blades any desired number may be employed. Moreover, while it is preferred to locate the fan at the place shown, that is, at the lower end of the armature shaft, yet it is obvious that the exact location shown is not essential but that the fan may be otherwise located, as for instance at the upper end of the armature shaft. In the present instance the lower set or series of openings extend through the gear casing and through the lower head or diaphragm 3, but the essential requirement in respect to the location of the holes is that they shall be at or near the opposite ends of the casing proper so that the currents of air will be caused to flow and circulate longitudinally through the interior of the casing and past the electric motor elements.

The handles 20, 21, are secured to the casing in suitable manner at diametrically opposite points. The handle 20 is a dead handle while the other handle 21 is arranged to control the electric switch governing the current to the motor. In the present instance, the inner end of the handle 21 is connected with a socket 22ª of a switch box or case 22 which is secured to the drill casing, in the manner clearly indicated in Fig. 2. Within the switch box is arranged a snap switch 23 of the usual and well known kind and therefore requiring no detailed description, except to say that the inner end of the handle 21 is operatively connected with the turn button 23ª of such switch. This handle is detachably connected with the switch box and also permitted to turn in the socket by means of a screw 24 whose inner end, when screwed up, is arranged to enter a circumferential groove 21ª in the reduced inner end of the handle 21.

Drilling machines made according to my invention are comparatively simple in construction and light in weight, so that they can be easily handled by the operator and applied to work located in any position. Moreover, such machines are extremely durable and effective and cannot be choked or stopped by the work or by too great pressure applied by the operator. Furthermore, the air cooling device prevents the heating and consequent burning or deterioration of the parts of the machine, with the result that such machines are capable of being run continuously and for long periods of time without injurious effects.

At the present day, electric power is almost universally used, especially where drilling machines are likely to be employed, and such power can be made accessible by running a supply cable, which is a very simple matter. On account of the extreme availability of electric power and the ease of its transmission to any place of use, electric drills possess many advantages over pneumatic drills and render them serviceable where heretofore no machine drill could be employed to advantage. These electric drills can, in fact, be connected to the ordinary electric light sockets commonly used in buildings and be operated by the current derived therefrom. The necessary power to run my drill is therefore practically constantly at hand in every locality, so that the field of usefulness of power drilling machines is materially increased.

Although I have described more or less precise forms and details of construction, I do not intend to be understood as limiting myself thereto, as I contemplate changes in form, proportion of parts and the substitution of equivalents as circumstances may suggest or render expedient.

I claim:

1. A portable electric drill adapted for manual support, and comprising a casing with upper and lower end heads, an electric motor arranged within the casing with its armature shaft journaled in said heads and having one end extended through the lower end head, a tool spindle, and gearing arranged outside the lower end head for connecting the adjacent ends of the spindle and armature shaft, and comprising a circular rack associated with said lower end head.

2. A portable electric drill adapted for manual support, and comprising a casing with upper and lower end heads, an electric motor with its armature shaft journaled in said heads and having one end extended through the lower end head, a tool spindle arranged in axial alinement with the armature shaft, and gearing arranged outside the lower end head for connecting the adjacent ends of the spindle and armature shaft, and comprising a toothed rack associated with said lower end head.

3. A portable electric drill adapted for manual support, and comprising a main casing with upper and lower heads, the lower head comprising a plate with marginal flanges extending in opposite directions, one of which flanges is connected with the casing, an electric motor arranged within the casing with its armature shaft journaled in and extending through said head, a gear casing detachably secured to the other of said flanges of the lower end head, a tool spindle journaled in said gear casing, and gearing mounted within the gear casing and forming the operating connection between the armature shaft and tool spindle.

4. A portable electric drill comprising a main casing forming the field frame of an electric machine and the body of the drill, a rotatable armature within said casing, end heads for the casing in which the armature shaft is journaled, a gear casing connected with the lower end head, a tool spindle journaled in said gear casing, gearing mounted within the gear casing and forming the operating connection between the armature shaft and tool spindle, a bearing for the shaft in the lower end head, an adjustable end-thrust bearing in the upper end head for the upper end of the armature shaft, and grasping handles secured to the main casing.

5. In an electric drill, a casing, an electric motor therein comprising an armature shaft, a spur pinion carried by said shaft, a tool spindle, planetary spur pinions carried by the spindle and meshing with the shaft pinion, and a relatively fixed circular toothed rack with which the pinions on the spindle are engaged.

6. A portable electric drill comprising a main casing forming the field frame of an electric machine and the body of the drill, a rotatable armature within said casing, end heads for the casing in which the armature shaft is journaled, a gear casing connected with the lower end head, a tool spindle journaled in said gear casing, gearing mounted within the gear casing and forming the operating connection between the armature shaft and tool spindle, said lower end head comprising a plate 3 having flanges 3ª and 3ᵇ for connection with the main casing and gear casing respectively and also having an opening through which the armature shaft extends and in which it has its bearing, said upper end head having an end thrust bearing for the upper end of the armature shaft, and grasping handles secured to the main casing.

7. An electric drill comprising a casing forming the field frame of an electric machine, a rotatable armature within said casing, end heads connected to the ends of the casing, the lower one of which has a thrust bearing to receive the lower end of the armature shaft, and the upper one of which has an adjustable bearing for the upper end of armature shaft, a tool spindle journaled in such casing and arranged in axial alinement with the armature shaft, a breast plate connected with the upper head, and means for operatively connecting the spindle and armature shaft.

8. An electric drill comprising a casing forming the field frame of an electric machine, a rotatable armature within said casing, end heads connected to the ends of the casing, the lower one of which has a thrust bearing to receive the lower end of the armature shaft and the upper one of which has a flanged opening, a bearing adjustable up and down in said flanged opening and adapted to receive the upper end of such shaft, a breast plate fitting over such opening, and a tool spindle journaled in such casing and operatively connected with the armature shaft.

9. An electric drill comprising a casing forming the field frame of an electric machine, a rotatable armature within said casing, end heads connected to the ends of the casing, the lower one of which has a thrust bearing to receive the lower end of the armature shaft and the upper one of which has a flanged opening, a bearing adjustable up and down in said flanged opening and adapted to receive the upper end of such shaft, brushes connected to the flange of said opening, a breast plate fitting over such opening, and a tool spindle journaled in such casing and operatively connected with the armature shaft.

10. An electric drill comprising a casing forming the field frame of an electric machine, a rotatable armature within said casing, end heads connected to the ends of the casing, the lower one of which has a thrust bearing to receive the lower end of the armature shaft and the upper one of which has a flanged opening, a ball cone on the armature shaft adjacent the upper head, a ball cup arranged in said opening and adjustable therein, a series of balls interposed between said cone and cup, and a tool spindle operatively connected with the armature shaft.

11. An electric drill comprising a casing forming the field frame of an electric machine, a rotatable armature within said casing, end heads connected to the ends of the casing, the lower one of which has a thrust bearing to receive the lower end of the armature shaft and the upper one of which has an opening flanged both inwardly and outwardly, an adjustable bearing in such opening for the armature shaft, a cap secured to the upper end head and engaging the outward flange of said opening, a breast plate on said cap, and a tool spindle operatively connected with the armature shaft.

12. An electric drill comprising a casing forming the field frame of an electric machine, a rotatable armature within said casing, end heads detachably connected to the ends of the casing, the upper one of which has an adjustable bearing for the upper end of the armature shaft, and the lower one a shouldered opening, a ball bearing for the lower end of the shaft and supported on said shoulder, a tool spindle operatively connected with said shaft by gearing, and a gear casing which is detachably connected with the lower end head and in which the gearing is mounted.

13. An electric drill comprising a casing forming the field frame of an electric machine, a rotatable armature within said casing, end heads detachably connected to the ends of the casing, and having bearings for the armature shaft, a gear case secured to the lower end head and having an internal circular rack, a driving pinion on the lower end of the armature shaft, a tool spindle, and the two pinions 14 carried thereby and meshing with the driving pinion and with the rack.

14. A portable electric drill comprising a casing, an electric motor therein, a tool spindle journaled in said casing and operatively connected with the armature shaft of the motor, grasping handles connected with the casing, one of the handles having a rotatable handle portion proper and a stationary and hollow base portion detachably connected with the casing, and an electric switch governing the current to the motor and operatively connected with said rotatable handle portion, said rotatable handle portion being bodily removable independently of the switch.

15. A portable electric drill comprising a casing, an electric motor therein, a tool spindle journaled in said casing and operatively connected with the armature shaft of the motor, grasping handles connected with the casing, one of the handles having a rotatable handle portion proper and a stationary base portion detachably connected with the casing, and an electric switch governing the current to the motor and operatively connected with said rotatable handle portion, said base portion being bodily removable independently of the switch and comprising a hollow part inclosing the switch and a tubular portion 22ª arranged to receive the inner end of the rotatable portion of the handle.

16. An electric drill comprising a casing, an electric motor therein having an armature shaft, a tool spindle journaled in said casing and operatively connected with the armature shaft, handles 20, 21 connected with the casing, a switch box 22 secured to the casing and to which the handle 21 is connected so as to have a rotary movement, and a switch arranged within said box to govern current to the motor and operatively connected with the handle 21.

17. An electric drill comprising a casing, an electric motor therein having an armature shaft, a tool spindle journaled in said casing and operatively connected with the armature shaft, handles 20, 21 connected with the casing, a switch box 22 secured to the casing and to which the handle 21 is connected so as to have a rotary movement, and a switch arranged within said box to govern current to the motor and having a switch button 23ª to which the handle 21 is operatively connected.

18. An electric drill comprising a casing, an electric motor therein having an armature shaft, a tool spindle journaled in said casing and operatively connected with the armature shaft, handles 20, 21 connected with the casing, a switch box 22 secured to the casing and having a socket 22ª to receive the handle 21, and a switch 23 governing the current to the motor and having a button 23ª operatively connected with the handle.

19. An electric drill comprising a casing, an electric motor therein having an armature shaft, a tool spindle journaled in said casing and operatively connected with the armature shaft, handles 20, 21 connected with the casing, a switch box 22 secured to the casing and having a socket 22ª to receive the handle 21 which is provided with a circumferential groove 21ª, a screw 24 extending through the side wall of the socket, and a switch 23 governing the current to the motor and having a button 23ª operatively connected with the handle.

20. In an electric drill, a casing, a head on one end of the casing and provided with openings for the circulation of air, a head attached to the opposite end of the casing and having a central opening, a thrust bearing fitted in said opening, a motor in the casing and including an armature shaft projecting out of said last named opening and journaled in said thrust bearing, a fan on the armature shaft within the casing and comprising blades fixed to the shaft adjacent said thrust bearing, a rotary tool spindle, gearing arranged outside of the last named end head and connecting said spindle with the armature shaft, and a gear case applied to the end of the casing and inclosing said gearing, said gear case being provided with air circulating openings to coöperate with those in the first named end head.

21. An electric drill comprising a casing, an electric motor completely inclosed by said casing, end heads forming part of said casing, the lower end head having a thrust bearing to receive the lower end of the armature shaft, a flanged opening on the upper end head, a bearing for the armature shaft adjustable up and down in said flanged opening, brushes adjustably mounted on the flange of said opening, a plate on the side of said end head, said plate being removable to permit access to said brushes, and a tool spindle journaled to said casing and operatively connected with the armature shaft.

22. An electric drill comprising a casing forming the field frame of an electric motor, a rotatable armature within said casing, end heads joined with said casing, a tool spindle journaled in the lower end head and operatively connected with said armature, a thrust bearing for one end of the armature shaft in said lower end head, a flanged opening in the upper end head, a bearing for the other end of the armature shaft in said flanged opening, said bearing being arranged to be adjustable from above, and a part for holding the drill to its work secured to the upper end head and covering the flanged opening therein.

23. An electric drill comprising a casing forming the field frame of an electric motor, a rotatable armature within said casing, end heads joined with said casing, a tool spindle journaled in the lower end head and operatively connected with said armature, a thrust bearing for one end of the armature shaft in said lower end head, a flanged opening in the upper end head, a bearing for the other end of the armature shaft in said upper end head, said bearing being arranged to be adjustable from above, a part for holding the drill to its work secured to the upper end head and covering the flanged opening therein, a commutator for the armature carried on the armature shaft, brushes for said commutator adjustably mounted within the upper end head on the flanged opening thereof, and a part on the side of the upper end head made removable to permit access to said commutator and brushes.

24. In a drill, the combination of a casing having inlet and outlet openings for air, motor fields carried by said casing, an armature within said casing between said inlet and outlet openings, a shaft driven by said armature, a rotatable drill spindle having a spider in said casing between the inlet and outlet openings, a gear driven by said armature-shaft, a gear carried by said spider and meshing with the armature-shaft gear, and means for supplying air through the inlet openings of the casing, substantially as specified.

25. In a drill, the combination of a casing provided at one end with air inlet openings and at the other end with air outlet openings, motor fields carried by said casing, an armature in said casing intermediate said inlet and outlet openings, a shaft within said casing driven by said armature, a rotatable drill spindle having one end projecting through an end of the casing, a spider carried by such end of the spidle, a gear carried by said spider, a gear driven by said armature-shaft and meshing with the gear carried by said spider, and means for supplying air through the inlet openings to the interior of the casing, and in contact with said gears, substantially as specified.

26. In a drill, the combination of a casing having openings in the opposite ends thereof, motor fields carried by said casing, an armature mounted in said casing, a shaft driven by said armature, a gear driven by said shaft, a rotatable drill spindle, a spider within said casing carried by said spindle and supporting a gear meshing with the armature-shaft gear, and a fan driven by said shaft for forcing air through the openings in said casing and in contact with said armature and gears, substantially as specified.

27. The combination of a casing having at one end inlet openings for air and at the other end outlet openings for air; motor fields carried by said casing, an armature within said casing, a shaft within said casing driven by said armature, a gear driven by said shaft, a rotatable drill spindle having one end projecting through an end of the casing, a spider carried by such end of the spindle, said spider being provided with a gear meshing with the gear driven by the armature-shaft and means operated by said motor shaft for forcing air through the openings in the ends of the casing, and in contact with said gears and armature, substantially as specified.

28. The combination of a casing having inlet openings at one end thereof and outlet openings at the opposite end thereof, motor fields carried by said casing, an armature within said casing, a shaft within said casing driven by said armature, a gear on said shaft, a rotatable drill spindle having one end projecting through an end of the casing, a spider within said casing carried by said spindle, planetary gears carried by said spider and meshing with the armature-shaft gear, and a fan on said shaft adjacent said gears, substantially as specified.

WILLIAM O. DUNTLEY.

Witnesses:
S. E. HIBBEN,
LOUIS B. ERWIN.